United States Patent Office

2,717,902
ORGANOPOLYSILOXANE FLUIDS STABILIZED WITH ORGANIC PHOSPHITES

Alfred R. Gilbert, Schenectady, N. Y., assignor to General Electric Company, a corporation of New York No Drawing. Application June 24, 1953, Serial No. 363,937

3 Claims. (Cl. 260—448.2)

This invention is concerned with organopolysiloxane fluids having improved stability and resistance to gelation at elevated temperatures. More particularly, the invention is concerned with a composition of matter comprising (1) an organopolysiloxane fluid and (2) a small amount in stabilizing proportions of an organic phosphite having the general formula $$(RO)_3P$$

where R is a member selected from the class consisting of alkyl, aryl, aralkyl, alkaryl, unsaturated aliphatic, and cyclic aliphatic radicals. Among the groups which R may represent are, for instance, alkyl, e. g., methyl, ethyl, propyl, butyl, isobutyl, decyl, etc. radicals; aralkyl radicals, e. g., benzyl, phenylethyl, etc. radicals; alkaryl radicals, e. g., tolyl, xylyl, ethylphenyl, etc. radicals; aryl radicals, e. g., phenyl, naphthyl, biphenyl, etc. radicals; unsaturated aliphatic radicals, e. g., vinyl, allyl, methallyl, etc. radicals; cycloaliphatic, e. g., cyclohexyl, cyclopentyl, cyclopentenyl, cyclohexenyl, etc. radicals.

The amount of the organophosphite (hereinafter intended to cover organophosphite compounds having the formula described above) which may be employed in the practice of the present invention may be varied widely depending upon such factors as the organopolysiloxane used, the particular organic phosphite employed, the application for which the invention is intended, etc. In general, I have found that good results are obtained when amounts from about 0.01 up to 2 per cent, by weight, of the organophosphite based on the weight of the organopolysiloxane fluid are employed. Amounts in excess of 2 per cent generally give no further advantages. Advantageously in some applications, the amount of organophosphite used should be no more than that which is soluble in the organopolysiloxane at room temperature (around 25 to 30° C.). Amounts in excess of that soluble at room temperature may be undesirable since the organic phosphite will tend to precipitate and cause a two-phase system which is unsatisfactory and of little utility in many applications in which the organopolysiloxane fluid may be employed.

The organopolysiloxane fluids with which the present invention is concerned may be found described and claimed in Patnode Patent 2,469,880 and 2,469,890 issued May 10, 1949, and assigned to the same assignee as the present invention. The above-identified two patents also described various methods whereby the organopolysiloxane fluids may be prepared.

The compositions herein described in their stabilized form can be used in applications as hydraulic fluids, damping media, as lubricating compositions, etc. The instant invention differs from that described and claimed in the copending application of Robert G. Linville, Serial No. 371,401, filed concurrently herewith and assigned to the same assignee as the present invention, in several respects. The preformed organopolysiloxane fluids stabilized in accordance with my invention are generally neutral fluids which have been suitably processed to remove any harmful ingredients therefrom used to prepare the organopolysiloxane fluids and which, if permitted to remain in the latter, would cause undesirable degradation or depolymerization. Among such depolymerizing materials may be mentioned alkali-metal compounds (which are used as polymerizing agents for the organopolysiloxane), such as alkali-metal hydroxides, alkali-metal alkoxides, etc., or reaction products of the aforesaid alkali-metal compounds with the organopolysiloxane. The organopolysiloxane fluids when dispersed in water will generally give a neutral or close to neutral pH. Moreover, whereas the invention described in the above-mentioned Linville application is concerned with the use of organophosphorus compounds for the purpose of deactivating any undesirable influences which the alkali-metal compounds or reaction products thereof with organopolysiloxanes may have on the organopolysiloxanes, the organic phosphites employed by me are intended for stabilizing these neutral organopolysiloxane fluids against oxidation at elevated temperatures. The discovery that organophosphorus compounds can be used to stabilize organopolysiloxanes containing alkali-metal atoms having deleterious effects on the organopolysiloxane is not my invention, but is the invention of Robert G. Linville.

In order that those skilled in the art may better understand how the present invention may be practiced, the following example is given by way of illustration and not by way of limitation. All parts are by weight.

EXAMPLE

In this example an organopolysiloxane fluid having the formula

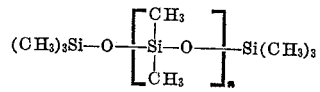

where $n$ is an integer greater than 1 (and which may be prepared in accordance with the description found in the abovementioned Patnode patents) and having a viscosity of about 100 centistokes was mixed with, in one case, 1.1 per cent tricresyl phosphite and in another case with 1.3 per cent triphenyl phosphite, both weights of the organic phosphites being based on the weight of the organopolysiloxane fluid. These samples, together with a control comprising the same methylpolysiloxane without the organophosphites, were heated at 200° C. for varying lengths of time, during which time the per cents weight loss of the organopolysiloxane was determined. The following table shows the results of these heat aging tests at the various times at which the weight loss of organopolysiloxane was determined.

Table

| Time, Hours | Percent Wt. Loss Control | Percent [a] Wt. Loss, Sample A | Percent [b] Wt. Loss, Sample B |
|---|---|---|---|
| 0 | 0 | 0 | 0 |
| 48 | 0.5 | | |
| 117 | | 4.3 | 4.6 |
| 143 | | | |
| 260 | 1.8 | | |
| 312 | | 4.5 | 5.6 |
| 334 | | 4.8 | 5.8 |
| 384 | 3.3 | | |
| 408 | 3.9 | | |
| 478 | Gelled | | |
| 886 | | 5.3 | 5.8 |
| 982 | | 5.4 | 5.9 |
| 996 | | 5.4 | 5.9 |
| | | 5.4 | 5.9 |

[a] Contained tri-(p-cresyl)phosphite. Did not gel until after about 1,992 hours at 200° C.
[b] Contained triphenyl phosphite. Did not gel until after about 1,266 hours at 200° C.

It will, of course, be apparent to those skilled in the art that instead of the methylpolysiloxane fluids described above, other organopolysiloxanes, for instance, ethylpolysiloxanes, phenylpolysiloxanes, methyl phenylpolysiloxanes (organopolysiloxanes containing both silicon-bonded methyl and silicon-bonded phenyl radicals), etc., as well as other organic phosphites of the description recited above in varying amounts may be employed without departing from the scope of the invention.

The organopolysiloxane fluids stabilized in accordance with my invention are intended to be used at elevated temperatures of the order of about 150 to 200° C. and accordingly should be free of solvents or other matter which will be lost at these temperatures. For the most part, my invention is directed to organopolysiloxane fluids which consist essentially of the organopolysiloxane itself and the organophosphite.

What I claim as new and desire to secure by Letters Patent of the United States is:

1. A composition of matter of improved stability at elevated temperatures consisting essentially of (1) a preformed substantially neutral organopolysiloxane fluid in which the organic groups of the organopolysiloxane are monovalent hydrocarbon radicals attached to silicon by carbon-silicon linkages and (2) heat-stabilizing amounts of an organic phosphite having the formula $$(RO)_3P$$

where R is a member selected from the class consisting of alkyl, aryl, and aralkyl radicals.

2. A composition of matter having improved stability at elevated temperatures consisting essentially of (1) a preformed substantially neutral methylpolysiloxane fluid and (2) heat-stabilizing amounts of tricresyl phosphite.

3. A composition of matter having improved stability at elevated temperatures consisting essentially of (1) a preformed substantially neutral methylpolysiloxane fluid and (2) heat-stabilizing amounts of triphenyl phosphite.

References Cited in the file of this patent

UNITED STATES PATENTS 2,437,232    Rothrock et al. _____ Mar. 2, 1948